(12) United States Patent
Zhu

(10) Patent No.: US 11,801,657 B2
(45) Date of Patent: Oct. 31, 2023

(54) FLEXIBLE DISPLAY MODULE AND MANUFACTURING METHOD THEREOF

(71) Applicant: WUHAN CHINA STAR OPTOELECTRONICS SEMICONDUCTOR DISPLAY TECHNOLOGY CO., LTD., Wuhan (CN)

(72) Inventor: Zhitao Zhu, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 292 days.

(21) Appl. No.: 17/265,120

(22) PCT Filed: Oct. 23, 2020

(86) PCT No.: PCT/CN2020/123123
§ 371 (c)(1),
(2) Date: Feb. 1, 2021

(87) PCT Pub. No.: WO2022/057005
PCT Pub. Date: Mar. 24, 2022

(65) Prior Publication Data
US 2022/0324196 A1 Oct. 13, 2022

(30) Foreign Application Priority Data

Sep. 17, 2020 (CN) .......................... 202010979423.8

(51) Int. Cl.
*B32B 7/14* (2006.01)
*B32B 3/30* (2006.01)
(Continued)

(52) U.S. Cl.
CPC ................. *B32B 3/30* (2013.01); *B32B 7/14* (2013.01); *B32B 17/06* (2013.01); *B32B 27/281* (2013.01);
(Continued)

(58) Field of Classification Search
CPC . B32B 17/06; B32B 2255/10; B32B 2307/42; B32B 2315/08; B32B 2379/08;
(Continued)

(56) References Cited

U.S. PATENT DOCUMENTS

2017/0357289 A1 12/2017 Ahn

FOREIGN PATENT DOCUMENTS

| CN | 108766247 A | 11/2018 |
| CN | 109003545 A | 12/2018 |

(Continued)

*Primary Examiner* — Lawrence D Ferguson
(74) *Attorney, Agent, or Firm* — The Roy Gross Law Firm, LLC; Roy Gross

(57) ABSTRACT

A flexible display module and a manufacturing method thereof are provided. The flexible display module includes a substrate, a second glue layer, and a display panel disposed in a stack. Wherein, the display panel includes a bending area, and a first groove is defined in a third area of the substrate corresponding to the bending area and filled with a first glue layer. More deformation can be provided and bending stresses can be reduced by the first glue layer and the second glue layer, thereby improving bending resistance of the flexible display module.

20 Claims, 5 Drawing Sheets

(51) Int. Cl.
  *B32B 17/06* (2006.01)
  *B32B 27/28* (2006.01)
  *B32B 37/12* (2006.01)
  *B32B 38/10* (2006.01)

(52) U.S. Cl.
  CPC .......... *B32B 37/1292* (2013.01); *B32B 38/10* (2013.01); *B32B 2255/10* (2013.01); *B32B 2307/42* (2013.01); *B32B 2315/08* (2013.01); *B32B 2379/08* (2013.01); *B32B 2457/20* (2013.01)

(58) Field of Classification Search
  CPC ..... B32B 2457/20; B32B 27/281; B32B 3/30; B32B 37/12; B32B 37/1292; B32B 38/10; B32B 7/14
  See application file for complete search history.

(56) References Cited

FOREIGN PATENT DOCUMENTS

| | | |
|---|---|---|
| CN | 110047393 A | 7/2019 |
| CN | 111402734 A | 7/2020 |
| CN | 111415589 A | 7/2020 |
| CN | 111667770 A | 9/2020 |
| CN | 211455154 U | 9/2020 |

FLEXIBLE DISPLAY MODULE AND MANUFACTURING METHOD THEREOF

CROSS REFERENCE TO RELATED APPLICATIONS

This application is a National Phase of PCT Patent Application No. PCT/CN2020/123123 having International filing date of Oct. 23, 2020, which claims the benefit of priority of Chinese Application No. 202010979423.8 filed Sep. 17, 2020. The contents of the above applications are all incorporated by reference as if fully set forth herein in their entirety.

FIELD OF INVENTION

The present disclosure relates to the field of display technologies, and more particularly, to a flexible display module and a manufacturing method thereof.

BACKGROUND OF INVENTION

Flexible display screens have become new type display devices having more potential in recent years due to their characteristics of lightweightness, thinness, and bendability. Since bending radii of different film layers are different, when the flexible display screens are bent, interlayer dislocation usually occurs between different film layers for adapting to bending deformation.

Technical problem: glue layers disposed among adjacent film layers have good flexibility in current technology, so the glue layers can be stretched or compressed simultaneously when interlayer dislocation occurs among the film layers. However, long-term stretching and compression will cause the glue layers to break, thereby causing the film layers to fall off.

SUMMARY OF INVENTION

The present disclosure provides a flexible display module and a manufacturing method thereof to solve a technical problem of film layers falling off caused by breaking glue layers when bending flexible display modules in current technology.

The present disclosure provides a flexible display module. The flexible display module includes:

a substrate including a first area, a second area, and a third area positioned between the first area and the second area, wherein first grooves are defined in the third area and filled with a first glue layer;

a second glue layer disposed on the substrate and covering the first glue layer; and a display panel disposed on the second glue layer and including a first display area, a second display area, and a bending area positioned between the first display area and the second display area, wherein the first display area is positioned corresponding to the first area, the second display area is positioned corresponding to the second area, and the bending area is positioned corresponding to the third area.

In the flexible display module provided in the present disclosure, a thickness of the first glue layer is less than a depth of the first groove.

In the flexible display module provided in the present disclosure, the first groove and the second grooves are spaced apart from each other.

In the flexible display module provided in the present disclosure, there are a plurality of first grooves, and the plurality of first grooves are spaced apart from each other in the third area.

In the flexible display module provided in the present disclosure, second grooves are each defined on one side of the first area adjacent to the third area and one side of the second area adjacent to the third area, and filled with a third glue layer.

In the flexible display module provided in the present disclosure, a depth of the first groove is greater than a depth of the second grooves.

In the flexible display module provided in the present disclosure, the flexible display module further includes a support plate disposed between the display panel and the second glue layer.

In the flexible display module provided in the present disclosure, one side of the support plate adjacent to the substrate is provided with a third groove defined corresponding to the first groove, and at least a part of the second glue layer extends into the third groove.

In the flexible display module provided in the present disclosure, the third groove penetrates through the support plate.

In the flexible display module provided in the present disclosure, materials of the first glue layer and the second glue layer are both an optical adhesive.

The present disclosure further provides a flexible display module. The flexible display module includes:

a substrate including a first area, a second area, and a third area positioned between the first area and the second area, wherein first grooves are defined in the third area and filled with a first glue layer;

a second glue layer disposed on the substrate and covering the first glue layer; and a display panel disposed on the second glue layer and including a first display area, a second display area, and a bending area positioned between the first display area and the second display area, wherein the first display area is positioned corresponding to the first area, the second display area is positioned corresponding to the second area, and the bending area is positioned corresponding to the third area;

wherein there are the plurality of first grooves, and the first grooves are spaced apart from each other in the third area.

In the flexible display module provided in the present disclosure, a thickness of the first glue layer is less than a depth of the first groove.

In the flexible display module provided in the present disclosure, second grooves are each defined on one side of the first area adjacent to the third area and one side of the second area adjacent to the third area, and filled with a third glue layer.

In the flexible display module provided in the present disclosure, a depth of the first groove is greater than a depth of the second grooves.

In the flexible display module provided in the present disclosure, the first groove and the second grooves are spaced apart from each other.

In the flexible display module provided in the present disclosure, the flexible display module further includes a support plate disposed between the display panel and the second glue layer.

In the flexible display module provided in the present disclosure, one side of the support plate adjacent to the substrate is provided with a third groove defined corresponding to the first groove, and at least a part of the second glue layer extends into the third groove.

In the flexible display module provided in the present disclosure, materials of the first glue layer and the second glue layer are both an optical adhesive.

Correspondingly, the present disclosure provides a manufacturing method of a flexible display module, which includes following steps:

providing a substrate including a first area, a second area, and a third area positioned between the first area and the second area;

forming a first groove in the third area;

forming a first glue layer in the first groove;

forming a second glue layer on the substrate, wherein the second glue layer covers the first glue layer; and disposing a display panel on the second glue layer, wherein the display panel includes a first display area, a second display area, and a bending area positioned between the first display area and the second display area, the first display area is positioned corresponding to the first area, the second display area is positioned corresponding to the second area, and the bending area is positioned corresponding to the third area.

In the manufacturing method of the flexible display module provided in the present disclosure, the first glue layer is formed in the first groove by coating process or sheet bonding process.

Beneficial effect: the present disclosure provides the flexible display module and the manufacturing method thereof. The flexible display module includes the substrate, the second glue layer, and the display panel disposed in a stack. Wherein, the display panel includes the bending area, and the first groove is defined in the third area of the substrate corresponding to the bending area and filled with the first glue layer. More deformation can be provided and bending stresses can be reduced by the first glue layer and the second glue layer, thereby improving bending resistance of the flexible display module.

DESCRIPTION OF DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

DETAILED DESCRIPTION OF PREFERRED EMBODIMENTS

Figure 1:
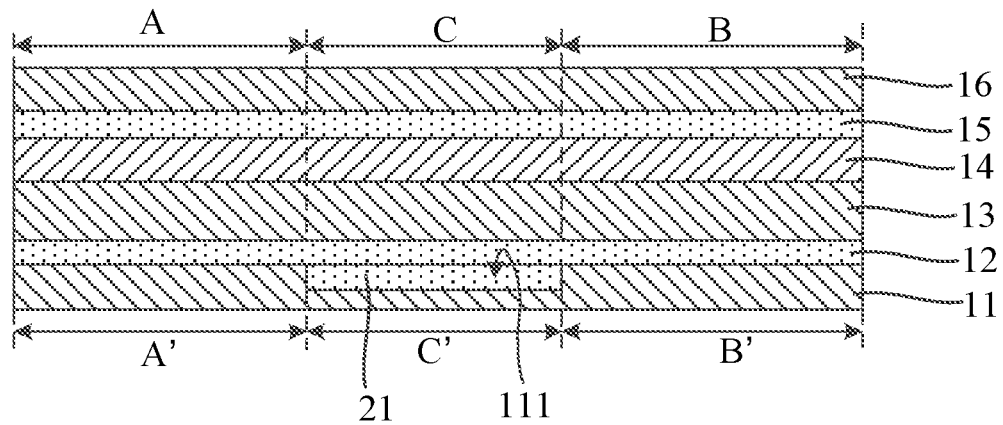
FIG. 1 is a first schematic structural diagram of a flexible display module according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

In the description of the present disclosure, it should be understood that terms such as "first" and "second" are used herein for purposes of description and are not intended to indicate or imply relative importance or implicitly indicating the number of technical features indicated. Thus, features limited by "first" and "second" are intended to indicate or imply including one or more than one of these features, and shall not be construed as causing limitations to the present disclosure. In addition, terms such as "on", "under", "inside", "outside", "side", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure.

Referring to FIG. 1, FIG. 1 is a first schematic structural diagram of a flexible display module according to an embodiment of the present disclosure. As shown in FIG. 1, the flexible display module includes: a substrate 11, a second glue layer 12 disposed on the substrate 11, and a display panel 13 disposed on the second glue layer 12. Wherein, the substrate 11 includes a first area A', a second area B', and a third area C' positioned between the first area A' and the second area B'. A first groove 111 is defined in the third area C'. The first groove 111 is filled with a first glue layer 21. The second glue layer 12 covers the first glue layer 21. The display panel 13 includes a first display area A, a second display area B, and a bending area C positioned between the first display area A and the second display area B. The first display area A is positioned corresponding to the first area A'. The second display area B is positioned corresponding to the second area B'. The bending area C is positioned corresponding to the third area C'.

Wherein, materials of the first glue layer 21 and the second glue layer 12 may be an optical adhesive or other adhesive materials having good adhesion and light transmittance. In some embodiments, the materials of the first glue layer 21 and the second glue layer 12 are same, thereby allowing the first glue layer 21 and the second glue layer 12 to fuse better. When the flexible display module is bent, the first glue layer 21 and the second glue layer 12 can provide more deformation and reduce bending stresses, thereby improving bending resistance of the flexible display module.

Wherein, a cross-sectional structure of the first groove 111 may be rectangular, trapezoidal, triangular, or semi-circular, and is not specifically limited in the present disclosure.

Wherein, in an embodiment of the present disclosure, the first groove 111 is completely filled with the first glue layer 21. At this time, if the materials of the first glue layer 21 and the second glue layer 12 are the same, the first glue layer 21 and the second glue layer 12 can completely fuse and provide more deformation, thereby improving the bending resistance of the flexible display module. In another embodiment of the present disclosure, a thickness of the first glue layer 21 is less than a depth of the first groove 111. At this time, when the flexible display module is bent, the second glue layer 12 has elastic deformation and may flow into the first groove 111, thereby preventing the second glue layer 12 from breaking.

Wherein, the bending area C may be used to display pictures or not be used to display pictures. Specifically, it can be set according to customer's specification requirements for flexible display modules, and is not limited in the present disclosure.

Wherein, in this embodiment, the flexible display module further includes a polarizer 14, an adhesive layer 15, and a glass cover plate 16 disposed on the display panel 13 in sequence. It should be noted that a film layer structure of the flexible display module provided in the embodiment of the present disclosure is not limited to this, and it cannot be construed as a limitation for the present disclosure.

Figure 2:
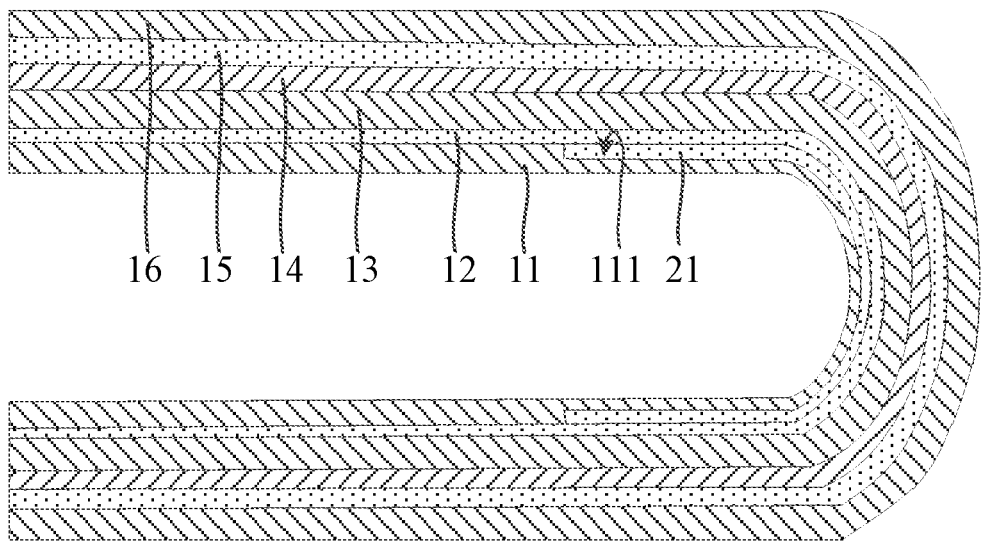
FIG. 2 is a schematic structural diagram of the flexible display module when bending according to an embodiment of the present disclosure.

Referring to FIG. 2, FIG. 2 is a schematic structural diagram of the flexible display module when bending according to an embodiment of the present disclosure. As shown in FIG. 2, the flexible display module provided in the present disclosure defines the first groove 111 in the third area C' of the substrate 11 corresponding to the bending area C and fills the first glue layer 21 in the first groove 111. More deformation can be provided and bending stresses can be reduced by the first glue layer 21 and the second glue layer 12, thereby improving the bending resistance of the flexible display module.

Figure 3:
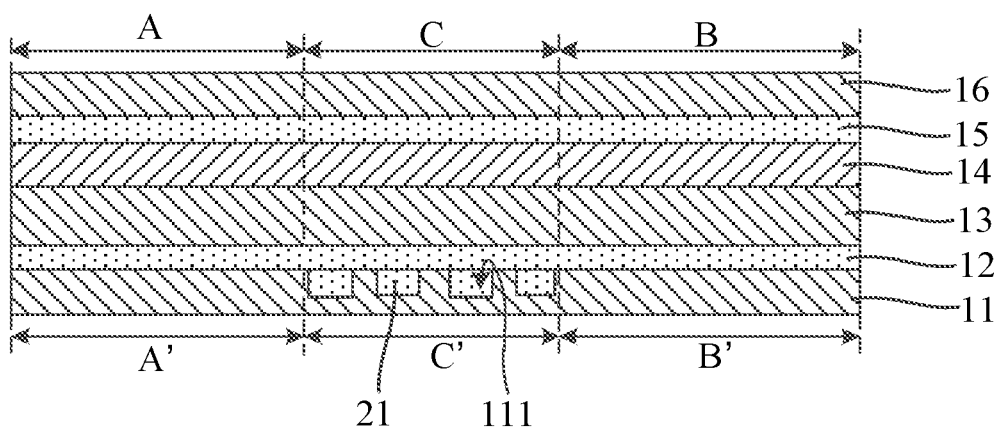
FIG. 3 is a second schematic structural diagram of the flexible display module according to an embodiment of the present disclosure.

Referring to FIG. 3, FIG. 3 is a second schematic structural diagram of the flexible display module according to an embodiment of the present disclosure. As shown in FIG. 3, a difference from the flexible display module shown in FIG. 1 is that in the flexible display module provided in this embodiment, there are a plurality of first grooves 111, and the plurality of first grooves 111 are spaced apart from each other in the third area C'. Disposition of the plurality of first grooves 111 can increase adhesion areas between the first glue layer 21 and the substrate 11, thereby improving a bonding strength between the substrate 11 and the display panel 13 and preventing the substrate 11 from falling off.

It should be noted that in some embodiments, the plurality of first grooves 111 can be continuously arranged in the third area C', which can improve the bonding strength between the substrate 11 and the display panel 13, and meanwhile, increase overall glue capacity of the first grooves 111.

Figure 4:
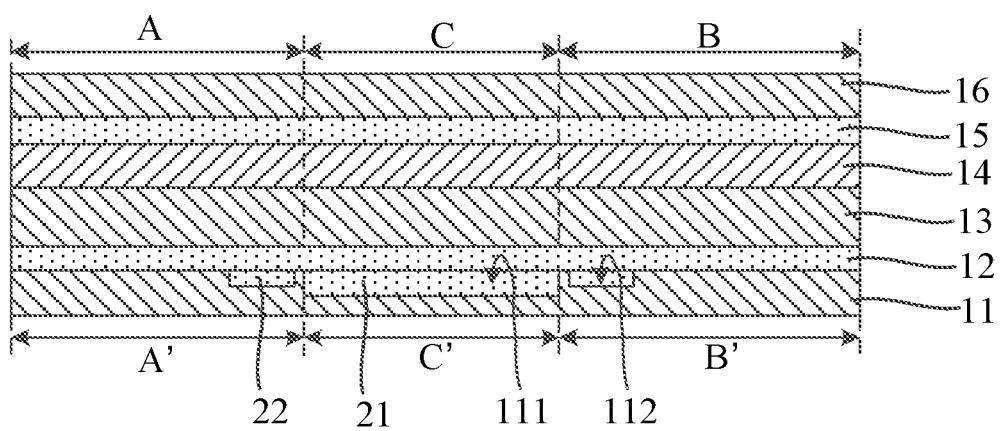
FIG. 4 is a third schematic structural diagram of the flexible display module according to an embodiment of the present disclosure.

Referring to FIG. 4, FIG. 4 is a third schematic structural diagram of the flexible display module according to an embodiment of the present disclosure. As shown in FIG. 4, a difference from the flexible display module shown in FIG. 1 is that in the flexible display module provided in this embodiment, second grooves 112 are each defined on one side of the first area A' adjacent to the third area C' and one side of the second area B' adjacent to the third area C'. The second grooves 112 are filled with a third glue layer 22.

It should be understood that when the flexible display module is bent, the substrate 11 positioned on the side of the first area A' adjacent to the third area C' and the side of the second area B' adjacent to the third area C' will also suffer corresponding stresses. Therefore, the side of the first area A' adjacent to the third area C' and the side of the second area B' adjacent to the third area C' are provided with the second grooves 112 filled with the third glue layer 22, thereby further reducing bending stresses and preventing the substrate 11 from falling off.

Wherein, a material of the third glue layer 22 may be the optical adhesive or other adhesive materials having good adhesion and light transmittance.

Wherein, a number of the second grooves 112 on each side may be single or plural. A cross-sectional structure of the second grooves 112 may be rectangular, trapezoidal, triangular, semi-circular, etc.

In an embodiment of the present disclosure, the first groove 111 and the second grooves 112 are connected to each other. In another embodiment of the present disclosure, the first groove 111 and the second grooves 112 are spaced apart from each other.

Further, the depth of the first groove 111 is greater than a depth of the second grooves 112. Since stresses suffered by the substrate 11 positioned in the third area C' are greater than stresses suffered by the substrate 11 positioned in the first area A' and the second area B', the depth of the first groove 111 is set to be greater than the depth of the second grooves 112, thereby ensuring rigidity of the substrate 11 and preventing the flexible display module from having wrinkles after bending, while adding the first glue layer 21 and the third glue layer 22.

Figure 5:
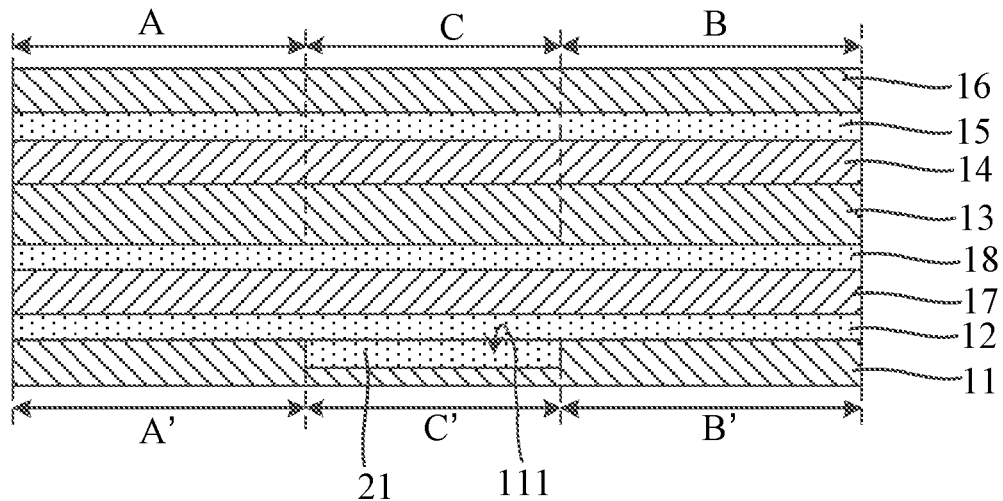
FIG. 5 is a fourth schematic structural diagram of the flexible display module according to an embodiment of the present disclosure.

Referring to FIG. 5, FIG. 5 is a fourth schematic structural diagram of the flexible display module according to an embodiment of the present disclosure. As shown in FIG. 5, a difference from the flexible display module shown in FIG. 1 is that the flexible display module provided in this embodiment further includes a support plate 17 disposed between the display panel 13 and the second glue layer 12.

Wherein, the support plate 17 is attached to the display panel 13 by a fourth glue layer 18. The support plate 17 may be made of polyimide and plays a role to support the display panel 13. Rigidity of the support plate 17 is weaker than rigidity of the substrate 11.

Figure 6:
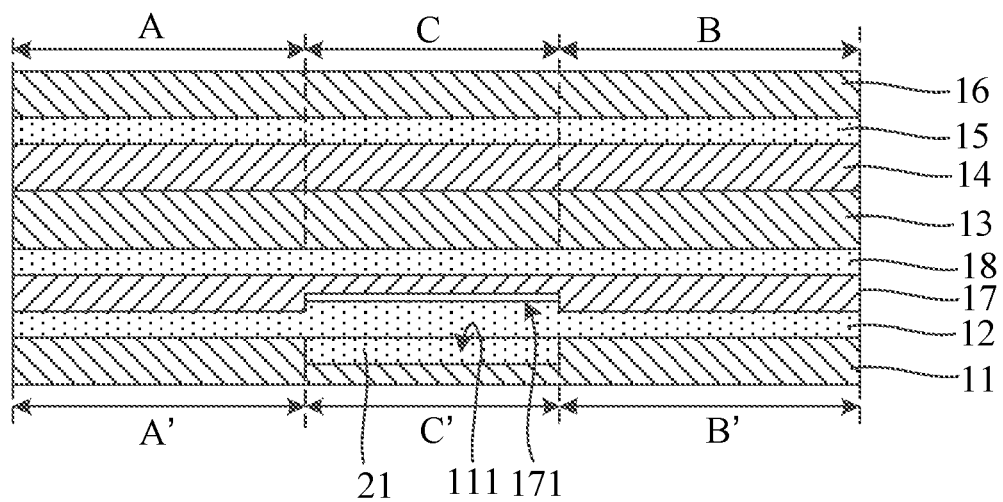
FIG. 6 is a fifth schematic structural diagram of the flexible display module according to an embodiment of the present disclosure.

Further, referring to FIG. 6, FIG. 6 is a fifth schematic structural diagram of the flexible display module according to an embodiment of the present disclosure. As shown in FIG. 6, a difference from the flexible display module shown in FIG. 5 is that in the flexible display module provided in this embodiment, one side of the support plate 17 adjacent to the substrate 11 is provided with a third groove 171. The third groove 171 is defined corresponding to the first groove 111. At least a part of the second glue layer 12 extends into the third groove 171.

In an embodiment of the present disclosure, the third groove 171 penetrates through the support plate 17. At this time, at least a part of the second glue layer 12 and the fourth glue layer 18 extends into the third groove 171, thereby improving bonding strength among the substrate 11, the support plate 17, and the display panel 13.

Figure 7:
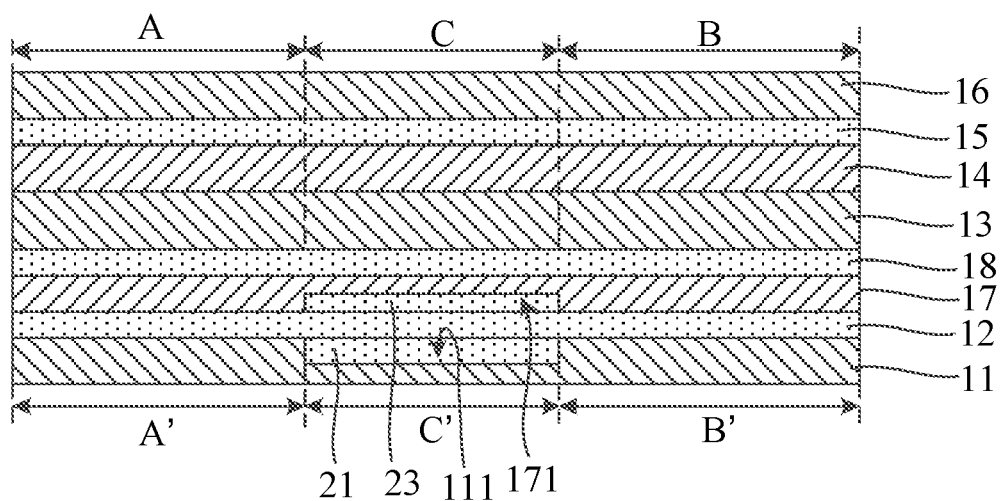
FIG. 7 is a sixth schematic structural diagram of the flexible display module according to an embodiment of the present disclosure.

In an embodiment of the present disclosure, referring to FIG. 7, FIG. 7 is a sixth schematic structural diagram of the flexible display module according to an embodiment of the present disclosure. As shown in FIG. 7, a difference from the flexible display module shown in FIG. 6 is that in the flexible display module provided in this embodiment, the third groove 171 is filled with a fifth glue layer 23. The third groove 171 is completely filled with the fifth glue layer 23, which allows the first glue layer 21, the second glue layer 12, and the fifth glue layer 23 to fuse, thereby providing more deformation, reducing the bending stresses, and improving the bending resistance of the flexible display module.

Figure 8:
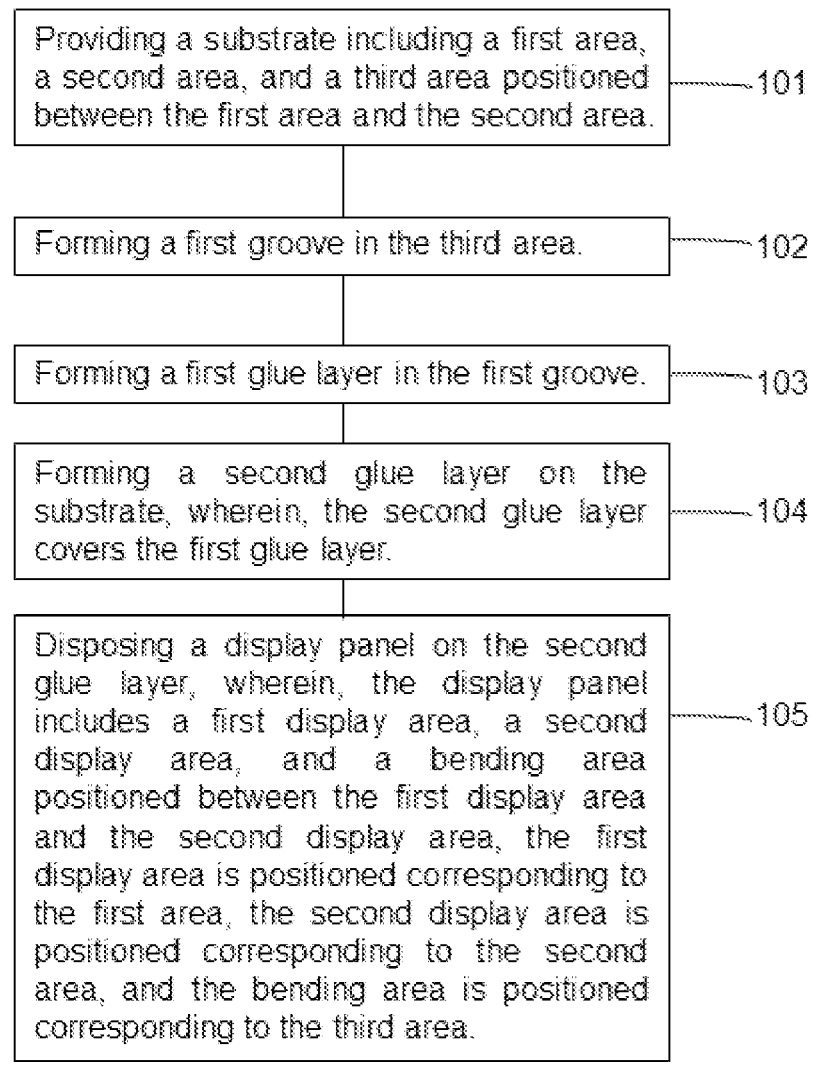
FIG. 8 is a flowchart of a manufacturing method of the flexible display module according to an embodiment of the present disclosure.

Referring to FIG. 8, FIG. 8 is a flowchart of a manufacturing method of the flexible display module according to an embodiment of the present disclosure. As shown in FIG. 8, the manufacturing method of the flexible display module provided in the present disclosure includes following steps.

Step 101: providing the substrate including the first area, the second area, and the third area positioned between the first area and the second area.

Step 102: forming the first groove in the third area.

Step 103: forming the first glue layer in the first groove.

Step 104: forming the second glue layer on the substrate, wherein, the second glue layer covers the first glue layer.

Step 105: disposing the display panel on the second glue layer, wherein, the display panel includes the first display area, the second display area, and the bending area positioned between the first display area and the second display area, the first display area is positioned corresponding to the first area, the second display area is positioned corresponding to the second area, and the bending area is positioned corresponding to the third area.

The present disclosure provides the manufacturing method of the flexible display module, which forms the first groove in the third area of the substrate corresponding to the bending area and fills the first glue layer in the first groove, so more deformation can be provided and breaking of the first glue layer 21 and the first glue layer 12 can be prevented by interaction between the first glue layer and the second glue layer, thereby improving the bending resistance of the flexible display module.

Specific embodiments are used to describe the manufacturing method of the present disclosure.

Referring to the flexible display module shown in FIG. 1, the manufacturing method of the flexible display module provided in the present disclosure includes following steps.

Step 101: providing the substrate including the first area, the second area, and the third area positioned between the first area and the second area.

Specifically, a material of the substrate 11 is a stainless-steel material, which has strong rigidity. When the flexible display module is bent, the substrate 11 plays a role for supporting and reducing wrinkles.

Step 102: forming the first groove in the third area.

Specifically, the first groove 111 is formed in the third area C' by processes such as laser etching. Wherein, a number of the first groove 111 may be single or plural. The cross-sectional structure of the first groove 111 may be rectangular, trapezoidal, triangular, or semi-circular, and is not specifically limited in the present disclosure.

Step 103: forming the first glue layer in the first groove.

Specifically, the first glue layer 21 may be formed in the first groove 111 by coating process or sheet bonding process. Coating process is directly coating a glue layer material in the first groove 111 to form the first glue layer 21. Sheet bonding process is directly bonding a sheet formed of the glue layer material into the first groove 111 to form the first glue layer 21.

Wherein, in an embodiment of the present disclosure, the first groove 111 is completely filled with the first glue layer 21, and in another embodiment of the present disclosure, the thickness of the first glue layer 21 is less than the depth of the first groove 111.

Wherein, the material of the first glue layer 21 may be the optical adhesive or other adhesive materials having good adhesion and light transmittance.

Step 104: forming the second glue layer on the substrate, wherein, the second glue layer covers the first glue layer.

Specifically, the second glue layer 12 is formed by coating a layer of the glue layer material on the substrate 11. The material of the second glue layer 12 may be the optical adhesive or other adhesive materials having good adhesion and light transmittance. The second glue layer 12 covers the first glue layer 21. When the first groove 111 is completely filled with the first glue layer 21, the second glue layer 12 can completely fuse with the first glue layer 21, thereby improving the bending resistance of the second glue layer 21.

In this embodiment of the present disclosure, the first glue layer 21 is formed in the first groove first, and then the second glue layer 12 is formed on the substrate 11, thereby improving quality of the flexible display module. It can be understood that due to existence of the first groove 111, if one-time coating process is used to form the first glue layer 21 and the second glue layer 12 simultaneously, a thickness of the second glue layer 12 will be nonuniform, which affects attachment between the substrate 11 and the display panel 13, thereby affecting the quality of the flexible display module.

Step 105: disposing the display panel on the second glue layer, wherein, the display panel includes the first display area, the second display area, and the bending area positioned between the first display area and the second display area, the first display area is positioned corresponding to the first area, the second display area is positioned corresponding to the second area, and the bending area is positioned corresponding to the third area.

Specifically, the display panel 13 is attached to the substrate 11 coated with the second glue layer 12, which allows the first display area A to be positioned corresponding to the first area A', the second display area B to be positioned corresponding to the second area B', and the bending area C to be positioned corresponding to the third area C'.

In the embodiment of the present disclosure, the polarizer 14, the adhesive layer 15, and the glass cover plate 16 can also be formed on the display panel 13 in sequence, which is not specifically limited in the present disclosure.

In an embodiment of the present disclosure, referring to the flexible display module shown in FIG. 5, the manufacturing method of the flexible display module provided in the present disclosure includes following steps.

Step 101: providing the substrate including the first area, the second area, and the third area positioned between the first area and the second area.

Step 102: forming the first groove in the third area.

Step 103: forming the first glue layer in the first groove.

Step 104: forming the second glue layer on the substrate, wherein, the second glue layer covers the first glue layer.

Step 105: disposing the display panel on the second glue layer, wherein, the display panel includes the first display area, the second display area, and the bending area positioned between the first display area and the second display area, the first display area is positioned corresponding to the first area, the second display area is positioned corresponding to the second area, and the bending area is positioned corresponding to the third area.

Wherein, please refer to the above content for the steps 101, 104, and 105, and the steps 102 and 103 include: forming the first groove 111 in the third area C', forming the second grooves 112 on the side of the first area A' adjacent to the third area C' and the side of the second area B' adjacent to the third area C', disposing the first glue layer 21 in the first groove 111, and disposing the third glue layer 22 in the second grooves 112.

Wherein, the first groove 111 and the second grooves 112 may be formed by a same process.

Wherein, in an embodiment of the present disclosure, the first groove 111 and the second grooves 112 are connected to each other. In another embodiment of the present disclosure, the first groove 111 and the second grooves 112 are spaced apart from each other.

Further, when the first groove 111 and the second grooves 112 are connected to each other, if the depth of the second grooves 112 is equal to the depth of the first groove 111, the first glue layer 21 and the third glue layer 22 may be formed by a same process, and if the depth of the second grooves 112 is less than the depth of the first groove 111, the first glue layer 21 and the third glue layer 22 may be formed respectively by the same process.

This embodiment of the present disclosure uses the same process to form the first groove 111 and the second grooves 112 on the substrate 11, thereby simplifying the manufacturing process, and meanwhile, addition of the third glue layer 22 can further improve the bending resistance of the flexible display module.

Referring to the flexible display module shown in FIGS. 7 and 8, the manufacturing method of the flexible display module provided in this embodiment of the present disclosure includes following steps.

Step 101: providing the substrate including the first area, the second area, and the third area positioned between the first area and the second area.

Step 102: forming the first groove in the third area.

Step 103: forming the first glue layer in the first groove.

Step 104: forming the second glue layer on the substrate, wherein, the second glue layer covers the first glue layer.

Step 105: disposing the display panel on the second glue layer, wherein, the display panel includes the first display area, the second display area, and the bending area positioned between the first display area and the second display area, the first display area is positioned corresponding to the first area, the second display area is positioned corresponding to the second area, and the bending area is positioned corresponding to the third area.

Wherein, please refer to the above content for steps 101 to 104, and the step 105 specifically includes following steps.

Step 1051: forming the support plate 17 on the second glue layer 12.

Specifically, the support plate 17 may be made of polyimide and plays the role to support the display panel 13.

Step 1052: forming the third groove 171 on one side of the support plate 17 adjacent to the substrate, wherein, the third groove 171 is defined corresponding to the first groove 111.

In an embodiment of the present disclosure, a depth of the third groove 171 is less than a thickness of the support plate 17.

In another embodiment of the present disclosure, the third groove 171 penetrates through the support plate 17.

In an embodiment of the present disclosure, the third groove 171 may be defined corresponding to the first groove 111 and the second grooves 112.

In an embodiment of the present disclosure, the fifth glue layer 23 may be formed in the third groove by the coating process or the sheet bonding process.

Step 1053: forming the fourth glue layer 18 on the support plate 17.

Specifically, a material of the fourth glue layer 18 may be the optical adhesive or other adhesive materials having good adhesion and light transmittance.

Step 1054: forming the display panel 13 on the fourth glue layer 18.

Specifically, the display panel 13 is attached to the support plate 17 by the fourth glue layer 18.

It should be noted that in the above embodiments of the manufacturing method of the flexible display module, the description of each embodiment has its own emphasis. For the parts that are not described in detail in an embodiment, refer to the detailed description of other embodiments above.

The flexible display module and the manufacturing method thereof provided in the present disclosure are described in detail above. Specific examples are used herein to explain the principles and implementation of the present disclosure. The descriptions of the above embodiments are only used to help understand the method of the present disclosure and its core ideas; meanwhile, for those ordinary skilled in the art, the range of specific implementation and application may be changed according to the ideas of the present disclosure. In summary, the content of the specification should not be construed as causing limitations to the present disclosure.

What is claimed is:

1. A flexible display module, comprising:
   a substrate comprising a first area, a second area, and a third area positioned between the first area and the second area, wherein a first groove is defined in the third area and filled with a first glue layer, and a second groove is defined in each of one side of the first area adjacent to the third area and one side of the second area adjacent to the third area;
   a second glue layer disposed on the substrate and covering the first glue layer; and
   a display panel disposed on the second glue layer and comprising a first display area, a second display area, and a bending area positioned between the first display area and the second display area, wherein the first display area is positioned corresponding to the first area, the second display area is positioned corresponding to the second area, and the bending area is positioned corresponding to the third area.

2. The flexible display module according to claim 1, wherein a thickness of the first glue layer is less than a depth of the first groove.

3. The flexible display module according to claim 1, wherein there are a plurality of first grooves, and the plurality of first grooves are spaced apart from each other in the third area.

4. The flexible display module according to claim 1, wherein the second groove is filled with a third glue layer.

5. The flexible display module according to claim 1, wherein a depth of the first groove is greater than a depth of the second groove.

6. The flexible display module according to claim 1, wherein the first groove and the second grooves are spaced apart from each other.

7. The flexible display module according to claim 1, further comprising a support plate disposed between the display panel and the second glue layer.

8. The flexible display module according to claim 7, wherein one side of the support plate adjacent to the substrate is provided with a third groove defined corresponding to the first groove, and at least a part of the second glue layer extends into the third groove.

9. The flexible display module according to claim 8, wherein the third groove penetrates through the support plate.

10. The flexible display module according to claim 1, wherein materials of the first glue layer and the second glue layer are both an optical adhesive.

11. A flexible display module, comprising:
- a substrate comprising a first area, a second area, and a third area positioned between the first area and the second area, wherein a plurality of first grooves are defined in the third area and filled with a first glue layer, and a second groove is defined in each of one side of the first area adjacent to the third area and one side of the second area adjacent to the third area;
- a second glue layer disposed on the substrate and covering the first glue layer; and
- a display panel disposed on the second glue layer and comprising a first display area, a second display area, and a bending area positioned between the first display area and the second display area, wherein the first display area is positioned corresponding to the first area, the second display area is positioned corresponding to the second area, and the bending area is positioned corresponding to the third area;
- wherein the plurality of first grooves are spaced apart from each other in the third area.

12. The flexible display module according to claim 11, wherein a thickness of the first glue layer is less than a depth of the plurality of first grooves.

13. The flexible display module according to claim 11, wherein the second groove is filled with a third glue layer.

14. The flexible display module according to claim 11, wherein a depth of the plurality of first grooves is greater than a depth of the second groove.

15. The flexible display module according to claim 11, wherein the plurality of first grooves and the second grooves are spaced apart from each other.

16. The flexible display module according to claim 11, further comprising a support plate disposed between the display panel and the second glue layer.

17. The flexible display module according to claim 16, wherein one side of the support plate adjacent to the substrate is provided with a third groove defined corresponding to the first grooves, and at least a part of the second glue layer extends into the third groove.

18. The flexible display module according to claim 11, wherein materials of the first glue layer and the second glue layer are both an optical adhesive.

19. A manufacturing method of a flexible display module, comprising following steps:
- providing a substrate comprising a first area, a second area, and a third area positioned between the first area and the second area;
- forming a first groove in the third area, and forming a second groove in each of one side of the first area adjacent to the third area and one side of the second area adjacent to the third area;
- forming a first glue layer in the first groove;
- forming a second glue layer on the substrate, wherein the second glue layer covers the first glue layer; and
- disposing a display panel on the second glue layer, wherein the display panel comprises a first display area, a second display area, and a bending area positioned between the first display area and the second display area, the first display area is positioned corresponding to the first area, the second display area is positioned corresponding to the second area, and the bending area is positioned corresponding to the third area.

20. The manufacturing method of the flexible display module according to claim 19, wherein the first glue layer is formed in the first groove by coating process or sheet bonding process.

* * * * *